(12) United States Patent
Kouno

(10) Patent No.: US 6,438,378 B1
(45) Date of Patent: Aug. 20, 2002

(54) DEVICE USING SELECTED RECEIVERS TO FACILITATE HANDOFF TO A BASE TRANSCEIVER STATION IN A MOBILE COMMUNICATION SYSTEM

(75) Inventor: Masaki Kouno, Kodama-gun (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/281,317

(22) Filed: Mar. 30, 1999

(30) Foreign Application Priority Data

Mar. 30, 1998 (JP) .......................................... 10-084718

(51) Int. Cl.$^7$ ................................................ H04Q 7/22
(52) U.S. Cl. .................... 455/439; 455/437; 455/443; 455/448; 455/67.3; 370/333
(58) Field of Search .............................. 455/436, 437, 455/440, 442, 524, 426, 443, 448, 525, 67.1, 67.3, 552, 553; 370/331, 332, 333

(56) References Cited

U.S. PATENT DOCUMENTS

| | | | | |
|---|---|---|---|---|
| 5,313,489 A | * | 5/1994 | Menich et al. | 370/332 |
| 5,594,718 A | * | 1/1997 | Weaver, Jr. et al. | 370/331 |
| 5,697,055 A | * | 12/1997 | Gilhousen et al. | 370/332 |
| 5,754,542 A | * | 5/1998 | Ault et al. | 370/342 |
| 5,978,679 A | * | 11/1999 | Agre | 455/437 |
| 6,021,328 A | * | 2/2000 | Curtis et al. | 455/436 |
| 6,026,301 A | * | 2/2000 | Satarasinghe | 455/436 |
| 6,240,292 B1 | * | 5/2001 | Haberman et al. | 455/439 |
| 6,263,205 B1 | * | 7/2001 | Yamaura et al. | 445/442 |

FOREIGN PATENT DOCUMENTS

| | | |
|---|---|---|
| EP | WO 97/14261 | 4/1997 |
| EP | WO 98/27776 | 6/1998 |
| JP | 8-130766 | 5/1996 |
| JP | 8-149551 | 6/1996 |
| JP | 9-284827 | 10/1997 |
| JP | 10-42369 | 2/1998 |

OTHER PUBLICATIONS

European Search Report dated Feb. 14, 2000.
Holeman et al., "CDMA Intersystem Operations" 1994, pp.590–594.
Satarasinghe, P. "A Novel Method for CDMA Hard Handoff" 1996, pp.1766–1768.

* cited by examiner

Primary Examiner—Lester G. Kincaid
(74) Attorney, Agent, or Firm—McGinn & Gibb, PLLC

(57) ABSTRACT

A mobile communication system actualizing a handoff is constructed by a mobile station, a first base transceiver station having a first radio communication area of a CDMA system, a second base transceiver station having a second radio communication area of a non-CDMA system, receiver stations and a base station controller. Herein, the mobile station travels from the first radio communication area to the second radio communication area while communicating with the first base transceiver station. When the mobile station detects an event that an Ec/Io value of a pilot signal transmitted thereto from the first base transceiver station exceeds a first threshold value, the base station controller determines the receiver stations which are located adjacent to the second base transceiver station. Then, the base station controller requests the receiver stations to receive uplink traffic signals respectively transmitted from the mobile station. Within the receiver stations, the base station controller selects a receiver station receiving the uplink traffic signal having a best Eb/No value, which is compared with a second threshold value. When it exceeds the second threshold value, the base station controller requests the mobile station to perform hard handoff from the first base transceiver station to the second base transceiver station while simultaneously requesting the second base transceiver station to enable handoff. Thus, it is possible to broaden the radio communication area of the CDMA system in a direction toward the service area of the non-CDMA system at a hard handoff mode.

19 Claims, 6 Drawing Sheets

AREA E    AREA F

AREA E    AREA F

DEVICE USING SELECTED RECEIVERS TO FACILITATE HANDOFF TO A BASE TRANSCEIVER STATION IN A MOBILE COMMUNICATION SYSTEM

BACKGROUND OF THE INVENTION

1. Field of the Invention

This invention relates to handoff devices used for mobile communication systems employing CDMA system.

This application is based on Patent Application No. Hei 10-84718 filed in Japan, the content of which is incorporated herein by reference.

2. Description of the Related Art

Generally, the term "handoff" is defined as the transfer of a cellular telephone call between cells when transmission quality drops below a specified connection threshold.

For example, the paper of Japanese Patent Application, Publication No. Hei 9-284827 discloses a handoff control system for the CDMA mobile communication system, which uses pilot signal sending devices to send pilot signals to the neighboring cells.

The paper of Japanese Patent Application, Publication No. Hei 8-149551 discloses a support system for a CDMA-to-CDMA different frequencies handoff in the cellular phone system of the CDMA system, which provides determination of the handoff to be effected between the base stations of different frequencies by using the primary frequency modulation.

In addition, the paper of Japanese Patent Application, Publication No. Hei 8-130766 discloses a mobile communication system, which selects the communication systems such as TDMA, CDMA and FDMA in response to the priority of the user.

Further, the paper of Japanese Patent Application, Publication No. Hei 10-42369 discloses an incoming call destination registration method for the mobile communication network, which automatically establishes an incoming call connection by managing a location of a radio mobile station which travels from one area to another.

By the way, according to the hard handoff method of the mobile communication system employing the CDMA system (where "CDMA" is an abbreviation for "Code Division Multiple Access"), a handoff from the service area of the CDMA system to the service area of another system is performed as follows:

A transmitter employing the CDMA system transmits pilot signals as identification signals. A "mobile" terminal device (or MS, i.e., mobile station) measures intensities of the identification signals. If measured values become greater than a prescribed value which is set in advance, a handoff request is issued with respect to a base station radio transceiver (or BTS, i.e., base transceiver station) employing the CDMA system.

However, the aforementioned handoff method of the mobile communication system suffers from a problem with regard to interference, as follows:

In FIG. 7, a radio communication area E used by the base transceiver station of the CDMA system partially overlaps with a radio communication area F used by the transmitter of the CDMA system. Herein, interference occurs in an overlapping area between the areas E and F. To avoid such interference, it is necessary to narrow down the radio communication area E that enables the communication service based on the CDMA system.

One reason why the aforementioned problem occurs is that in the CDMA system, both of the base transceiver station and transmitter use the same frequency. So, transmission waves of the transmitter act as interference waves as well. In the case where the transmitter amplifies input signals thereof up to a high output level when transmitting them, it is necessary to provide linearity in amplification up to such a high output level (or high electric power level). In consideration of the efficiency in such amplification, the transmitter consumes a large amount of electric power which is approximately twenty times as much as an amount of electric power generally consumed. For this reason, the transmitter inevitably demands a large amount of electric power. This raises a problem that the mobile communication system as a whole requires high cost and large scale of system configuration.

SUMMARY OF THE INVENTION

It is an object of the invention to provide a handoff device for the mobile communication system that is capable of performing hard handoff from the service area of the CDMA system to the service area of another system without reducing the radio communication area of the CDMA system which is placed adjacent to the radio communication area of another system.

According to this invention, a mobile communication system actualizing a handoff is constructed by a mobile station, a first base transceiver station having a first radio communication area based on a CDMA system, a second base transceiver station having a second radio communication area based on a non-CDMA system, receiver stations and a base station controller. Herein, the mobile station travels from the first radio communication area to the second radio communication area while communicating with the first base transceiver station. When the mobile station detects an event that an Ec/Io value of a pilot signal transmitted thereto from the first base transceiver station exceeds a first threshold value, the base station controller determines the receiver stations which are located adjacent to the second base transceiver station. Then, the base station controller requests the receiver stations to receive uplink traffic signals respectively transmitted from the mobile station. The base station controller selects a receiver station receiving the uplink traffic signal having a best Eb/No value within the receiver stations. Such a best Eb/No value of the uplink traffic signal of the selected receiver is compared with a second threshold value. When it exceeds the second threshold value, the base station controller requests the mobile station to perform hard handoff from the first base transceiver station to the second base transceiver station while simultaneously requesting the second base transceiver station to enable handoff.

Incidentally, the first threshold value is determined in such a way that the first radio communication area is narrower than a limit radio communication area in which the mobile station is capable of communicating with the first base transceiver station. In addition, an Eb/No value of the uplink traffic signal received by the first base transceiver station is set to the second threshold value.

Thus, it is possible to broaden the radio communication area of the CDMA system in a direction toward the service area of the non-CDMA system at a hard handoff mode.

BRIEF DESCRIPTION OF THE DRAWINGS

These and other objects, aspects and embodiment of the present invention will be described in more detail with reference to the following drawing figures, of which.

DESCRIPTION OF THE PREFERRED EMBODIMENT

This invention will be described in further detail by way of examples with reference to the accompanying drawings.

Figure 1:
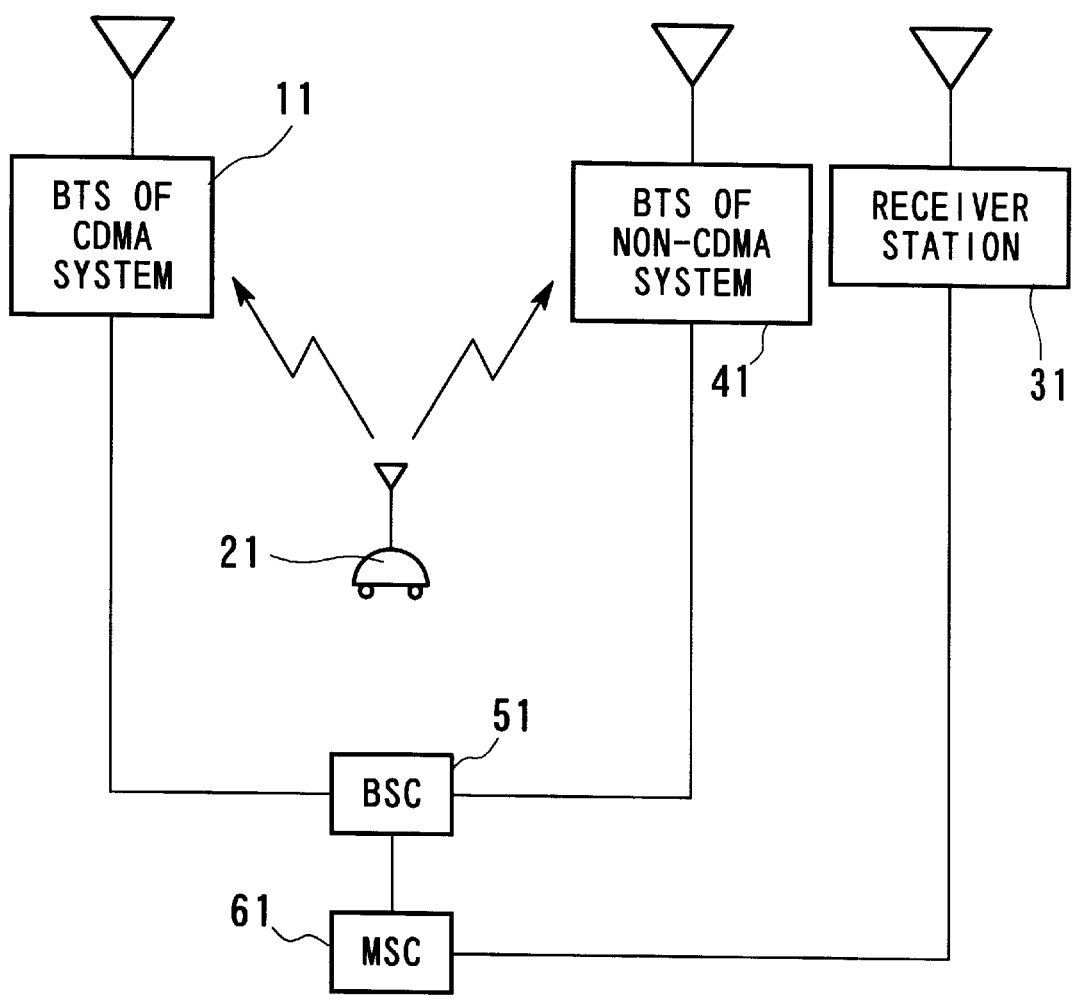
FIG. 1 is a block diagram showing a mobile communication system which is used to explain a handoff device in accordance with embodiment of the invention.

FIG. 1 is a block diagram showing a configuration of a mobile communication system to which a handoff device is applicable in accordance with embodiment of the invention.

In FIG. 1, a base transceiver station (BTS) 11 provides the service of the CDMA system. A mobile station (BS) 21 performs communications with the base transceiver station 11. In addition, a base transceiver station (BTS) 31 provides the service of another system (i.e., non-CDMA system) other than the CDMA system. That is, the mobile station 21 tries to continue a conversation thereof by performing a handoff from the base transceiver station 11 of the CDMA system to the base transceiver station 31 of the non-CDMA system. A receiver station 41 has a radio reception area which is equivalent to a radio communication area of the base transceiver station 31 of the non-CDMA system. Herein, the receiver station 41 is capable of receiving CDMA signals which are transmitted thereto by the mobile station 21. A base station controller (BSC) 51 controls the base transceiver station 11 and the receiver station 41. A mobile service switching center (MSC) 61 establishes connections between the CDMA system and another system.

In the mobile communication system of FIG. 1, quality of pilot signals is defined according to TIA standard IS-95 (where "TIA" stands for "Telecommunication Industry Association" of the United States), which sets a value of "Ec/Io", i.e., a ratio between "energy of pilot signals per 1PN chip" and "energy of interference waves per 1 Hz in reception band". Such a value is compared with a first threshold value (or threshold value "A") which is set by the base transceiver station 11 in advance. If the mobile station 21 detects an event that the Ec/Io value exceeds the threshold value A, it reports the base station controller 51 via the base transceiver station 11 such an event. Thus, the base station controller 51 makes a decision as to whether or not there exists a receiver station 41 which is located adjacent to the base transceiver station 11. If the base station controller 51 determines that such a receiver station 41 is located adjacent to the base transceiver station 11, it instructs (or requests) the receiver station 41 to start reception of uplink traffic signals of the mobile station 21.

The base station controller 51 selects the receiver station 41 which receives the uplink traffic signal of the best quality within receiver stations (not shown specifically) respectively receiving the uplink traffic signals of the mobile station 21. Herein, the quality of the traffic signal is determined based on a value of "Eb/No", i.e., a ratio between "energy of the traffic signal per one bit" and "energy of noise per 1 Hz", for example. Then, the base station controller 51 compares the Eb/No value output from the selected receiver station 41 with a second threshold value (or threshold value "B"). If the Eb/No value exceeds the threshold value B, the base station controller 51 issues a request to the mobile station 21 via the base transceiver station 11 that is currently communicating with the mobile station 21. Herein, the base station controller 51 requests the mobile station 21 to perform hard handoff to the base transceiver station 31 having a radio communication area C which is equivalent to a radio reception area B of the selected receiver station 41. At the same time, the base station controller 51 provides the mobile service switching center 61 with a request that enables a handoff to the base transceiver station 31. In accordance with the above request, the mobile station 21 performs the hard handoff to the base transceiver station 31 of the non-CDMA system which is other than the CDMA system used by the base transceiver station 11.

Figure 2:
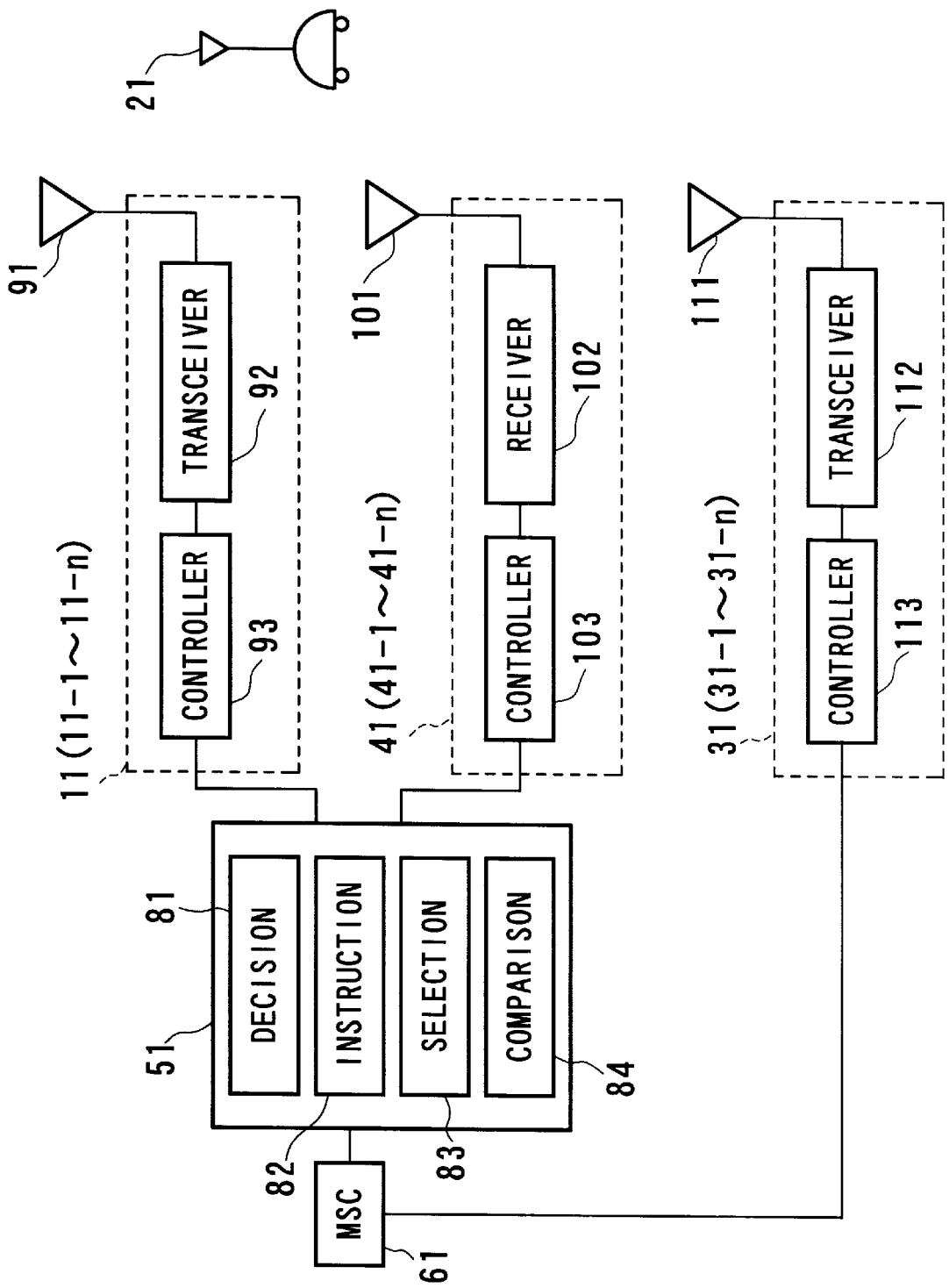
FIG. 2 is a block diagram showing detailed configurations of blocks shown in FIG. 1.
Figure 3:
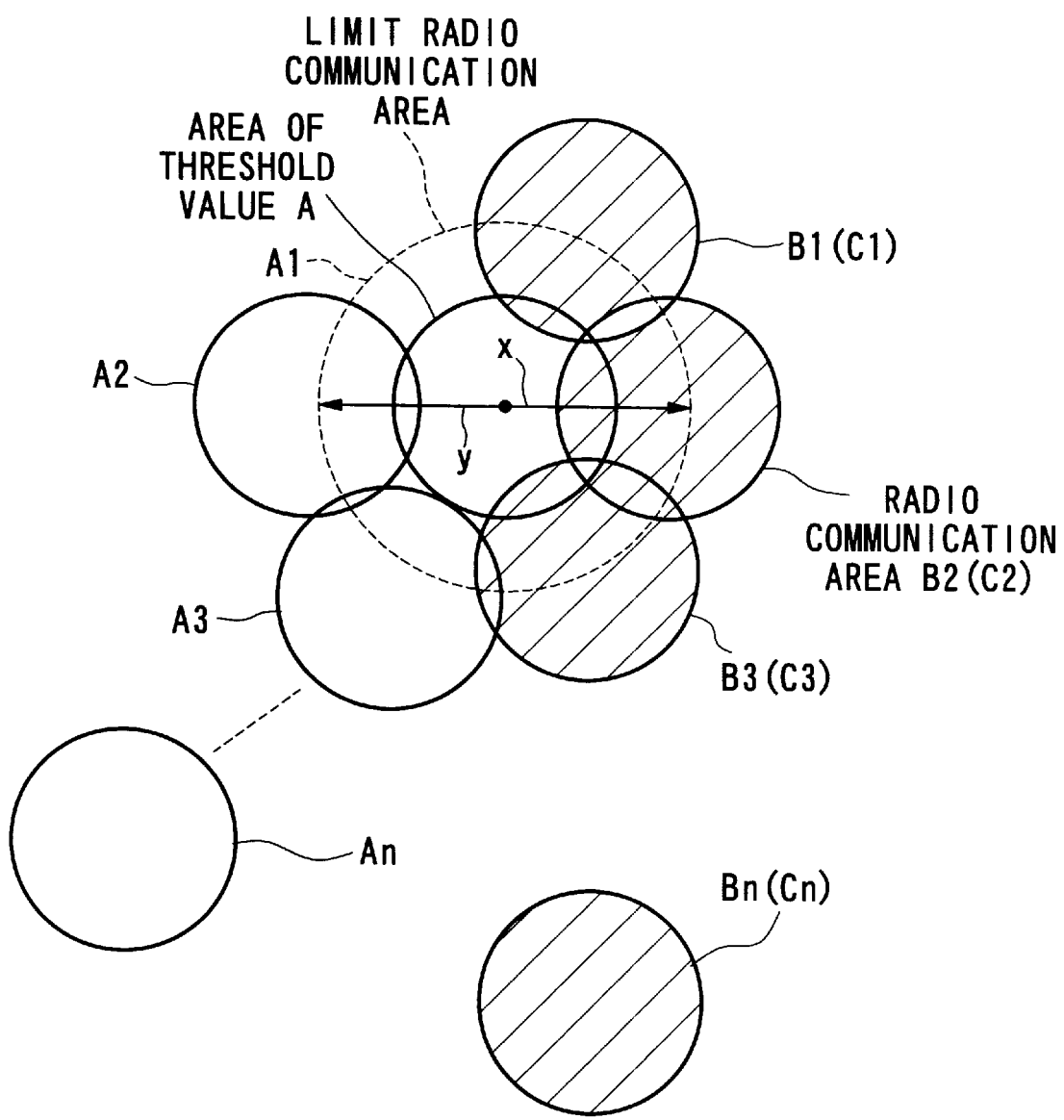
FIG. 3 is a pictorial plan view showing positional relationships between radio communication areas of base transceiver stations and radio reception areas of receiver stations.

FIG. 2 is a block diagram showing detailed configurations of blocks shown in FIG. 1. Herein, there are provided "n" sets of the base transceiver station 11, base transceiver station 31 and receiver station 41, where "n" is an integer. That is, a block of a dotted line denoted by "11" represents each of the base transceiver stations 11-1 to 11-n employing the CDMA system; a block of a dotted line denoted by "31" represents each of the base transceiver stations 41-1 to 41-n employing the non-CDMA system; and a block of a dotted line denoted by "41" represents each of the receiver stations 41-1 to 41-n. In addition, the base transceiver stations 11-1 to 11-n have radio communication areas A1 to An respectively; the receiver stations 41-1 to 41-n have radio reception areas B1 to Bn respectively; and the base transceiver stations 31-1 to 31-n have radio communication areas C1 to Cn respectively. FIG. 3 is a pictorial plan view showing arrangement of the aforementioned areas, which are represented by circles. Herein, each of the circles without hatching designates each of the radio communication areas A1 to An based on the CDMA system, while each of the circles with hatching designates each of the radio communication areas B1 to Bn based on the non-CDMA system.

In FIG. 2, the base station controller 51 works as a high level station for the base transceiver stations and receiver stations, so it is connected to the base transceiver stations 11-1 to 11-n and the receiver stations 41-1 to 41-n. All of the base transceiver stations 11-1 to 11-n use frequency of to cover the radio communication areas A1 to An respectively. In addition, the receiver stations 41-1 to 41-n use the same frequency of to cover the radio reception areas B1 to Bn respectively. Incidentally, the radio reception areas B1 to Bn of the receiver stations 41-1 to 41-n correspond to the uplink radio communication range of the radio waves of the mobile station 21. The mobile service switching center 61 is connected to the base station controller 51 as its high level station. The mobile service switching center 61 is also connected to the base transceiver stations 31-1 to 31-n employing the non-CDMA system. The base transceiver stations 31-1 to 31-n use frequency f1, which is different from the aforementioned frequency of, to cover the radio communication areas C1 to Cn respectively. In FIG. 3, the radio reception areas B1 to Bn roughly match with the radio communication areas C1 to Cn respectively.

The base station controller 51 contains a decision unit 81, an instruction unit 82, a selection unit 83 and a comparison unit 84. The decision unit 81 makes decisions as to whether or not there exist the receiver stations 41-1 to 41-n located adjacent to the base transceiver stations 11-1 to 11-n respectively. Herein, the decision is made in response to trigger using the Ec/Io value of the pilot signal which is transmitted from the mobile station 21 via each of the base transceiver stations 11-1 to 11-n.

The instruction unit 82 is activated when the decision unit 81 determines that there exist the receiver stations 41-1 to 41-n located adjacent to the base transceiver stations 11-1 to 11-n respectively. In this case, the instruction unit 82 instructs the receiver stations 41-1 to 41-n, which are located adjacent to the radio communication areas A1 to An respectively, to receive the uplink traffic signals of the mobile station 21.

Among the receiver stations 41-1 to 41-n receiving the uplink traffic signals respectively, the selection unit 83 a receiver station 41-x (where "x" is an integer selected from a range between 1 and n) which receives the uplink traffic signal having the best Eb/No value. The comparison unit 84 compares the Eb/No value of the uplink traffic signal of the selected receiver station with the threshold value B. Through the comparison, if the comparison unit 84 detects that the Eb/No value exceeds the threshold value B, the instruction unit 82 requests the mobile station 21 to perform hard handoff to a base transceiver station 31-x within the base transceiver stations 31-1 to 31-n employing another system (i.e., non-CDMA system). Herein, the base transceiver station 31-x has a radio communication area Cx which approximately matches with a radio reception area Bx of the receiver station 41-x. At the same time, the instruction unit 82 provides the mobile service switching center 61 with a request that enables the handoff to the radio transceiver station 31-x of the non-CDMA system.

Each of the base transceiver stations 11-1 to 11-n employing the CDMA system is configured by an antenna 91, a transceiver 92 and a controller 93. In addition, each of the receiver stations 41-1 to 41-n is configured by an antenna 101, a receiver 102 and a controller 103. Each of the base transceiver stations 31-1 to 31-n employing the non-CDMA system is configured by a transceiver 112 and a controller 113. For convenience ' sake, FIG. 2 shows one set of the base transceiver station 11, receiver station 41 and base transceiver station 31, whereas there are actually provided "n" sets of them.

Figure 4:
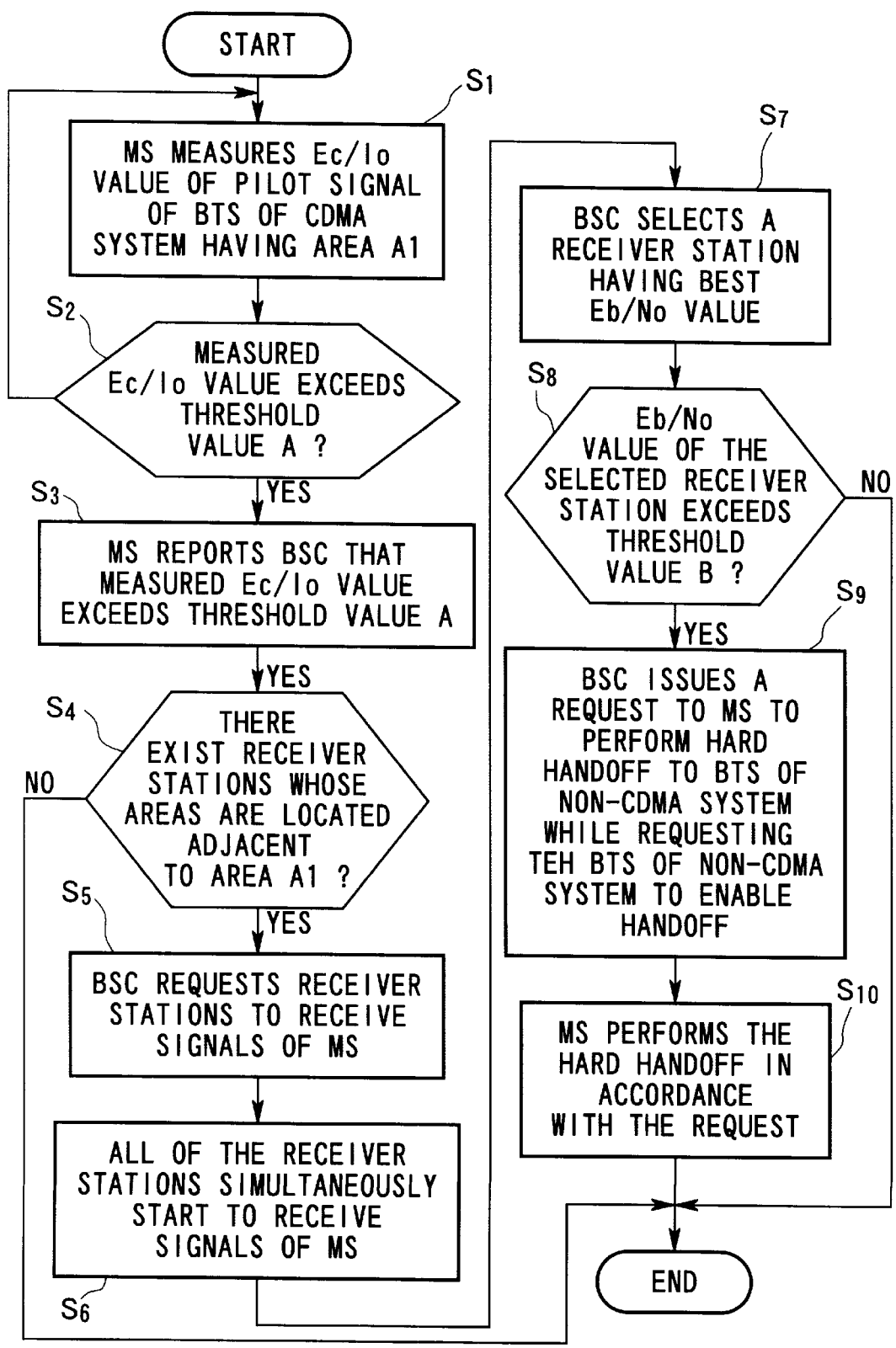
FIG. 4 is a flowchart showing a series of procedures that are performed to actualize hard handoff from the base transceiver station of the CDMA system to the base transceiver station of the non-CDMA system.

Next, a description will be given with respect to operations of the mobile communication system employing the handoff device in accordance with the embodiment of the invention with reference to a flowchart shown in FIG. 4. Herein, the description is given with respect to the situation that the mobile station 21 travels from the cell corresponding to the radio communication area of the CDMA system to another cell corresponding to the radio communication area of the non-CDMA system, wherein the mobile station 21 is presently performing communication in the radio communication area of the CDMA system. For example, when the base transceiver station 11-1 allocates a cell using the aforementioned frequency of of the radio communication area A1 to the mobile station 21, the mobile station 21 starts communication by means of the transceiver 92 and the controller 93 of the base transceiver station 11-1. At this time, the base transceiver station 11-1 sets the threshold value A to request the mobile station 21 to perform hard handoff. Suppose a situation that during the communication in progress, the mobile station 21 travels in a direction "x" (see FIG. 3) from the radio communication area A1 to the radio reception area B2 (or radio communication area C2). Incidentally, the radio communication areas A1 to An correspond to the service areas of the CDMA system, while the radio reception areas B1 to Bn (shown by the circles with hatching) correspond to the service areas of AMPS system provided by Alps Corporation of the United States (where "AMPS" is an abbreviation for "Advanced Mobile Phone System"0 ), for example.

In step S1, the mobile station 21 measures the Ec/Io value of the pilot signal of the base transceiver station 11-1. In step S2, the measured Ec/Io value is compared with the threshold value A which is set in advance by the base transceiver station 11-1. Herein, the threshold value A is set in such a way that with respect to the radio communication area A1, an area of the threshold value A becomes narrower than a limit radio communication area in which the mobile station 21 is capable of performing communication with the base transceiver station 11-1. In other words, it is necessary to set the threshold value A such that the mobile station 21 is capable of receiving a hard handoff signal transmitted by the base transceiver station 11-1. If the step S2 detects an event that the measured Ec/Io value exceeds the threshold value A, the mobile station 21 issues a report to the base station controller 51 via the base transceiver station 11-1 to inform it of such an event in step S3.

The base station controller 51 receiving such a report now activates the decision unit 81 to make decisions as to whether or not there exist the receiver stations 41-1 to 41-n having radio reception areas located adjacent to the radio communication area A1 of the base transceiver station 11-1 in step S4. If none of the receiver stations 41-1 to 41-n has the radio reception area that is located adjacent to the radio communication area A1, the decision unit 81 abandons the report. On the other hand, if at least one of the receiver stations 41-1 to 41-n has the radio reception area that is located adjacent to the radio communication area A1, the instruction unit 82 requests such receiver station to receive signals of the mobile station 21 in step S5. Suppose an example that the receiver station 41-1 is located within the radio communication area A1 of the base transceiver station 11-1. In such an example, the instruction unit 82 of the base station controller 51 requests the receiver stations 41-1 to 41-3, having the radio reception areas B1 to B3 which are located adjacent to each other, to receive the signals of the mobile station 21. Thus, all of the receiver stations 41-1 to 41-3 simultaneously start to receive the signals of the mobile station 21 in step S6. Then, they provide reception results regarding the Eb/No values, which are reported to the selection unit 83. Based on those reception results, the selection unit 83 selects a receiver station 41-x having a radio reception area Bx which has the best Eb/No within the receiver stations 41-1 to 41-3 in step S7. For example, the selection unit 83 selects the receiver station 41-2.

In step S8, the comparison unit 84 compares the Eb/No value of the selected receiver station 41-2 with the threshold value B. As the threshold value B, the base station controller 51 sets the Eb/No value of the traffic signal received by the base transceiver station 11-1 that is presently communicating with the mobile station 21. So, the comparison unit 84 compares the Eb/No value of the traffic signal received by the receiver station 41-2 with the Eb/No value of the traffic signal received by the "presently communicating" base transceiver station 11-1. Suppose an example that the mobile station 21 travels in a direction "y" shown in FIG. 3 while communicating with the base transceiver station 11-1 having the radio communication area A1, wherein the selection unit 83 selects the receiver station 41-2 having the best Eb/No value within the receiver stations 41-1 to 41-n. In this example, the comparison unit 84 compares the Eb/No value of the selected receiver station 41-2 with the threshold value B. Herein, the radio reception area B2 of the receiver station 41-2 exists far from the radio communication area A1 of the CDMA system. For this reason, it can be said that the Eb/No value of the receiver station 41-2 does not normally exceed the threshold value B.

Suppose an example that the mobile station 21 travels in the direction x shown in FIG. 3, wherein the selection unit 83 selects the receiver station 41-2 having the best Eb/No value within the receiver stations 41-1 to 41-n. Then, the comparison unit 84 compares the Eb/No value of the selected receiver station 41-2 with the threshold value B. If the foregoing step S8 determines that the Eb/No value exceeds the threshold value B, the instruction unit 82 issues a request to the mobile station 21 via the base transceiver station 11-1 which is presently communicating with the mobile station 21. Herein, the instruction unit 82 instructs the mobile station 21 to perform hard handoff to the base transceiver station 31-2 of the non-CDMA system having the radio communication area C2 which approximately matches with the radio reception area B2 of the selected receiver station 41-2. At the same time, the instruction unit 82 provides the mobile service switching center 61 with a request that enables a handoff to the base transceiver station 31-2 in step S9. In accordance with such a request, the mobile station 21 performs the hard handoff to the base transceiver station 31-2 of the non-CDMA system in step S10.

Figure 5:
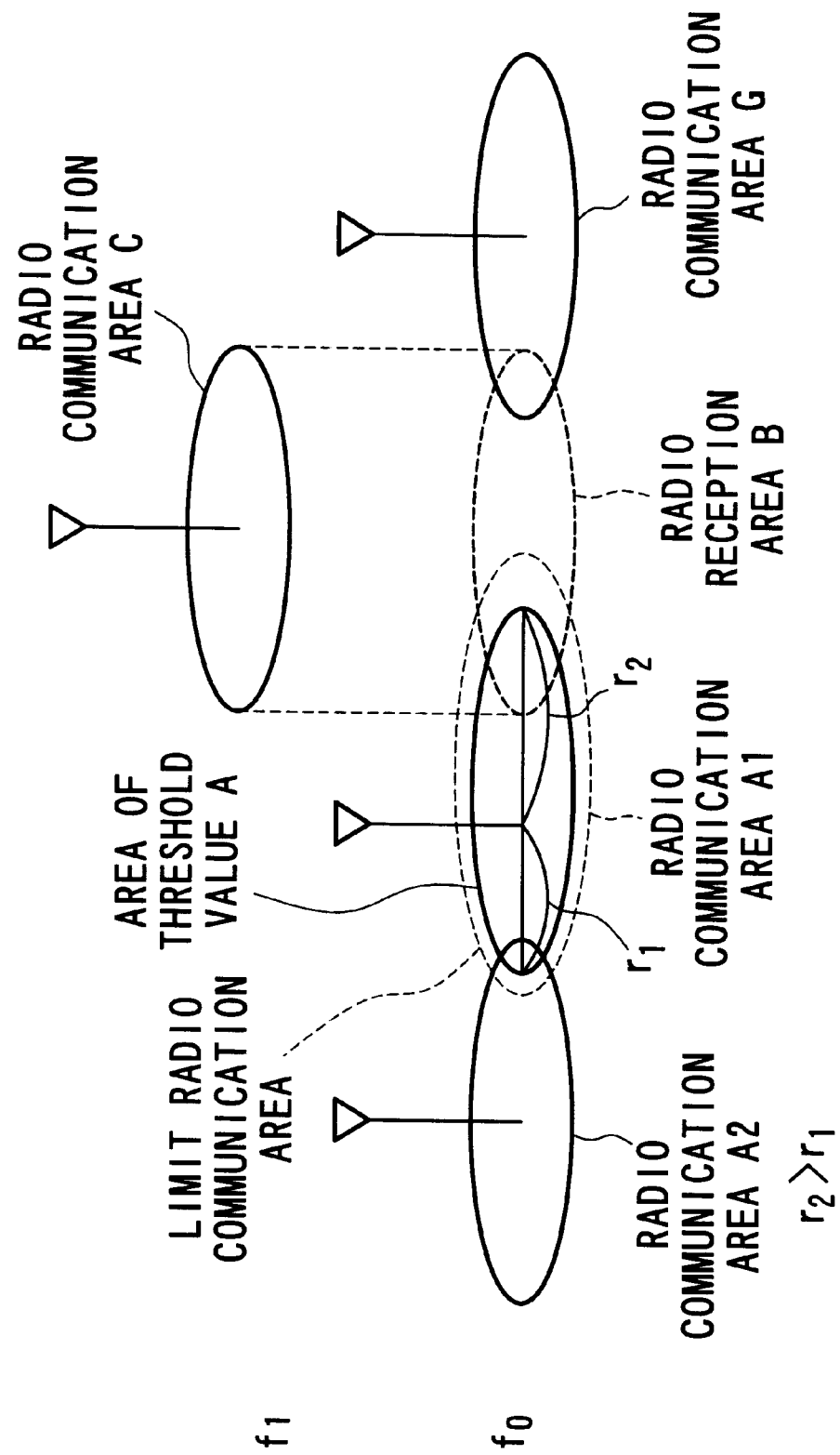
FIG. 5 shows an example of a positional relationship between areas to explain interference and screening.
Figure 6:
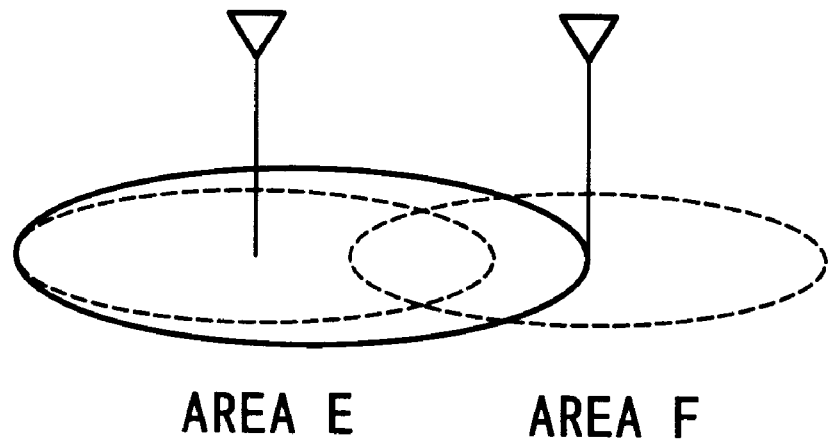
FIG. 6 shows a non-interference state between neighboring areas.
Figure 7:
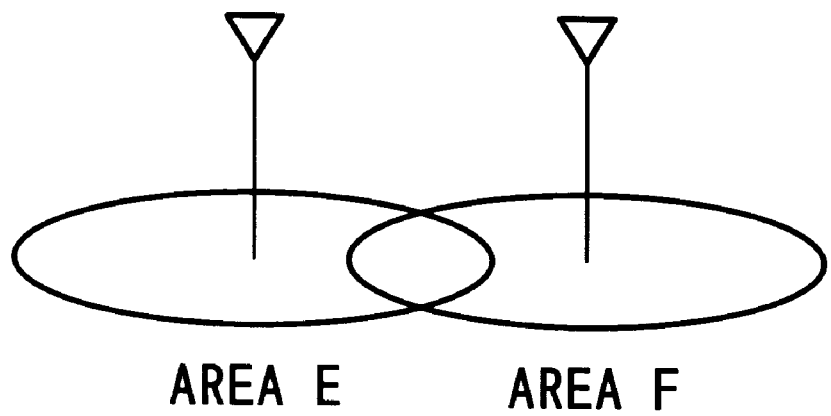
FIG. 7 shows an interference state between the neighboring areas which are placed adjacent to each other.

As compared with the conventional handoff method using the transmitter, the handoff method of this invention has an advantage that the radio communication area of the CDMA system can be broadened in a direction toward the neighboring area of the non-CDMA system. Such an advantage of this invention will be described with reference to FIG. 6. In FIG. 6, no interference occurs between a radio communication area E of the base transceiver station and a radio reception area F of the receiver. That is, it is possible to reduce unnecessary radio waves on the air (or in the space). According to another merit of this invention, it is possible to narrow down a range of the screening on the air, which is required among the CDMA systems using the same frequency band. Herein, the screening is required to eliminate a certain band of radio waves of the non-CDMA system, which act as interference waves when a new CDMA system (or else) is introduced in the mobile communication system. This invention does not require such screening, which will be described with reference to FIG. 5. In FIG. 5, an area B is located between an area A1 (or an area of the threshold value A) and an area G with regard to a frequency of. The conventional technology uses the transmitter for the area B to output CDMA waves at the frequency of, so a radius distance r2 of the neighboring area should be relatively short. In contrast, this invention is designed such that the CDMA waves are not output in the area B, so it is possible to increase the radius distance r2. In addition, the conventional technology requires the screening with regard to the area G of the frequency of. However, this invention does not require such screening because the CDMA waves are not output in the area B.

As described above, the conventional technology uses the transmitter to normally output the pilot signals as the identification signals, wherein the radio transmission area of the transmitter interferes with the radio communication area of the base transceiver station. In contrast, this invention does not require the transmitter, in other words, this invention uses the receiver, which does not output the CDMA waves, instead of the transmitter. Thus, this invention is capable of demonstrating a variety of effects as follows:

(1) It is possible to avoid occurrence of the interference between the neighboring areas.
(2) It is possible to broaden the area of the CDMA system in a direction toward the neighboring area of the non-CDMA system.
(3) It is possible to actualize the hard handoff to the service area of the non-CDMA system with small demand in electric power. In addition, it is possible to downsize the mobile communication system as a whole, so it is possible to construct the mobile communication system with the low cost.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A handoff device for a mobile communication system comprising:
   a mobile station for receiving a pilot signal from a first base transceiver station to issue a report that quality of the pilot signal exceeds a first threshold value which is determined in advance;
   a base station controller for receiving the report from the mobile station so as to make decisions as to whether or not there exist receiver stations which are located adjacent to the first base transceiver station, so that the base station controller selects a receiver station, which receives an uplink traffic signal having a best quality from the mobile station within the receiver stations; and
   a second base transceiver station whose system is different from the first base transceiver station, said second base transceiver station having a radio communication area which matches with an area of the selected receiver station whose uplink traffic signal has the best quality,
   wherein when the best quality of the uplink traffic signal of the selected receiver station exceeds a second threshold value which is determined in advance, the base station controller requests the mobile station to perform hard handoff from the first base transceiver station to the second base transceiver station, and wherein the base station controller also requests the second base transceiver station to enable handoff.

2. A handoff device for the mobile communication system according to claim 1 wherein the base station controller comprises
   decision means for based on the pilot signal transmitted thereto from the mobile station via the first base transceiver station, making decisions as to whether or not there exist the receiver stations which are located adjacent to the first base transceiver station,
   instruction means for when the decision means determines that there exist the receiver stations located adjacent to the radio communication area of the first base transceiver station, instructing the receiver stations respectively to receive uplink traffic signals from the mobile station, said instruction means also requesting the mobile station to perform the hard handoff to the second base transceiver station whose area matches with the area of the receiver station while simultaneously requesting the second base transceiver station to enable the handoff,
   selection means for selecting the receiver station whose uplink traffic signal has the best quality within the receiver stations, and
   comparison means for comparing the quality of the uplink traffic signal of the selected receiver station exceeds the second threshold value, so that when the quality exceeds the second threshold value, the comparison means controlling the instruction means to request the mobile station to perform the hard handoff.

3. A handoff device for the mobile communication system according to claim 2, wherein the receiver station has the area which corresponds to an uplink radio communication range that communication of the mobile station reaches.

4. A handoff device for the mobile communication system according to claim 2, wherein the first threshold value is set in such a way that the radio communication area of the first base transceiver station is narrower than a limit radio communication area in which the mobile station is capable of communicating with the first base transceiver station.

5. A handoff device for the mobile communication system according to claim 2, wherein the quality of the pilot signal is defined by a ratio between energy of the pilot signal per 1 PN chip and energy of interference waves per 1 Hz of reception band.

6. A handoff device for the mobile communication system according to claim 2, wherein the quality of the uplink traffic signal is defined by a ratio between energy of the uplink traffic signal per one bit and energy of noise per 1 Hz.

7. A handoff device for the mobile communication system according to claim 2, wherein the first base transceiver station employs a CDMA system while the second base transceiver station employs a non-CDMA system other than the CDMA system.

8. A handoff device for the mobile communication system according to claim 1 wherein the receiver station has the area which corresponds to an uplink radio communication range that communication of the mobile station reaches.

9. A handoff device for the mobile communication system according to claim 1 wherein the first threshold value is set in such a way that the radio communication area of the first base transceiver station is narrower than a limit radio communication area in which the mobile station is capable of communicating with the first base transceiver station.

10. A handoff device for the mobile communication system according to claim 1 wherein the quality of the pilot signal is defined by a ratio between energy of the pilot signal per 1 PN chip and energy of interference waves per 1 Hz of reception band.

11. A handoff device for the mobile communication system according to claim 1 wherein the quality of the uplink traffic signal is defined by a ratio between energy of the uplink traffic signal per one bit and energy of noise per 1 Hz.

12. A handoff device for the mobile communication system according to claim 1 wherein the first base transceiver station employs a CDMA system while the second base transceiver station employs a non-CDMA system other than the CDMA system.

13. A mobile communication system comprising:
    a mobile station;
    a first base transceiver station employing a first system for communicating with the mobile station;
    a second base transceiver station employing a second system for communicating with the mobile station;
    a plurality of receiver stations which are located adjacent to the second base transceiver station and which are capable of receiving uplink traffic signals respectively from the mobile station; and
    a base station controller for controlling the first base transceiver station and the second base transceiver station as well as the plurality of receiver stations,
    wherein when the mobile station reports the base station controller an event that quality of a pilot signal transmitted from the first base transceiver station exceeds a first threshold value, the base station controller selects a receiver station whose uplink traffic signal has a best quality within the plurality of receiver stations, and
    wherein when the quality of the uplink traffic signal of the selected receiver station exceeds a second threshold value, the base station controller requests the mobile station to perform hard handoff from the first base transceiver station to the second base transceiver station while also requesting-the second base transceiver station to enable handoff.

14. A mobile communication system according to claim 13 wherein the first system corresponds to a CDMA system while the second system corresponds to a non-CDMA system other than the CDMA system.

15. A mobile communication system according to claim 13 further comprising a mobile station switching center linked with the base station controller to control the second base transceiver station.

16. A mobile communication system according to claim 13 wherein the quality of the pilot signal is defined by an Ec/Io value while the quality of the uplink traffic signal is defined by an Eb/No value.

17. A handoff method for a mobile communication system which is constructed by a mobile station, a first base transceiver station having a first radio communication area based on a CDMA system, a second base transceiver station having a second radio communication area based on a non-CDMA system and a base station controller as well as a plurality of receiver stations which are located adjacent to the second base transceiver station, said handoff method, which is effected when the mobile station travels from the first radio communication area to the second radio communication area by the base station controller being,reported from the mobile station an event that an Ec/Io value of a pilot signal, which is transmitted by the first base transceiver station and is measured by the mobile station, exceeds a first threshold value, comprising the steps of:

determining the plurality of receiver stations which are located adjacent to the second base transceiver station;

requesting the plurality of receiver stations to receive uplink traffic signals respectively transmitted from the mobile station;

selecting a receiver station receiving the uplink traffic signal having a best Eb/No value within the plurality of receiver stations;

detecting an event that the best Eb/No value of the uplink traffic signal of the selected receiver station with a second threshold value; and requesting the mobile station to perform hard handoff from the first base transceiver station to the second base transceiver station while simultaneously requesting the second base transceiver station to enable handoff.

18. A handoff method for the mobile communication system according to claim 17 wherein the first threshold value is determined in such a way that the first radio communication area of the first base transceiver station is narrower than a limit radio communication range in which the mobile station is capable of communicating with the first base transceiver station.

19. A handoff method for the mobile communication system according to claim 17 wherein an Eb/No value of an uplink traffic signal, which is transmitted from the mobile station and is received by the first base transceiver station, is set to the second threshold value.

* * * * *